(12) United States Patent
Busarow (10) Patent No.: US 10,281,081 B2
(45) Date of Patent: May 7, 2019

(54) LEG FOR AN APPARATUS FOR SUPPORTING AN OBJECT

(71) Applicant: Oberwerk Corporation, Dayton, OH (US)

(72) Inventor: Kevin Busarow, Dayton, OH (US)

(73) Assignee: Oberwerk Corporation, Dayton, OH (US)

( * ) Notice: Subject to any disclaimer, the term of this patent is extended or adjusted under 35 U.S.C. 154(b) by 0 days.

(21) Appl. No.: 15/911,524

(22) Filed: Mar. 5, 2018

(65) Prior Publication Data

US 2018/0274717 A1    Sep. 27, 2018

Related U.S. Application Data

(60) Provisional application No. 62/476,128, filed on Mar. 24, 2017.

(51) Int. Cl.
| | |
|---|---|
| *F16M 11/26* | (2006.01) |
| *F16M 11/32* | (2006.01) |
| *F16M 11/16* | (2006.01) |
| *F16M 11/12* | (2006.01) |
| *F16M 11/34* | (2006.01) |
| *F16M 11/28* | (2006.01) |
| *F16M 11/36* | (2006.01) |

(52) U.S. Cl.
CPC ............ *F16M 11/26* (2013.01); *F16M 11/12* (2013.01); *F16M 11/16* (2013.01); *F16M 11/32* (2013.01); *F16M 11/28* (2013.01); *F16M 11/34* (2013.01); *F16M 11/36* (2013.01); *F16M 2200/02* (2013.01); *F16M 2200/027* (2013.01)

(58) Field of Classification Search
CPC .. F16M 2200/027; F16M 11/16; F16M 11/34; F16M 11/32; F16M 11/28; F16M 11/36
USPC ...... 248/188.5, 168, 163.1, 177.1; 52/126.6; 135/69
See application file for complete search history.

(56) References Cited

U.S. PATENT DOCUMENTS

| | | | |
|---|---|---|---|
| 311,578 A | 2/1885 | Haskell | |
| 683,993 A | 10/1901 | Schirber | |
| 821,335 A * | 5/1906 | Butler | F16M 11/16 248/168 |
| 880,063 A | 2/1908 | Beilfuss | |
| 1,358,402 A | 11/1920 | Thalhammer | |
| 1,426,088 A * | 8/1922 | Mitchell | F16M 11/36 248/188.5 |

(Continued)

FOREIGN PATENT DOCUMENTS

| | | |
|---|---|---|
| CN | 102537616 A | 7/2012 |
| CN | 202612993 U | 12/2012 |

(Continued)

*Primary Examiner* — Jonathan Liu
*Assistant Examiner* — Taylor L Morris
(74) *Attorney, Agent, or Firm* — Fortunato IP Law, LLC; David M. Fortunato (57) ABSTRACT

An improved leg for an apparatus for supporting an object. The improved leg may be provided as at least one leg of a tripod for supporting an object, the tripod having a plurality of legs each having upper and lower leg assemblies that are arranged in moving relation with each other, wherein the at least one leg is configured to prevent that leg of the apparatus from collapsing.

13 Claims, 6 Drawing Sheets

(56) References Cited

U.S. PATENT DOCUMENTS

| | | | | |
|---|---|---|---|---|
| 1,517,825 | A * | 12/1924 | Bruneau | F16M 11/34 248/171 |
| 1,672,596 | A * | 6/1928 | Zerk | F16M 11/14 182/111 |
| 1,863,761 | A * | 6/1932 | Neuwirth | F16B 7/1472 248/168 |
| 1,896,086 | A * | 2/1933 | Howell | F16M 11/16 248/168 |
| 1,915,628 | A * | 6/1933 | Thalhammer | F16M 11/10 248/188.5 |
| 1,962,428 | A * | 6/1934 | Colbie | E02D 5/52 138/148 |
| 2,231,783 | A * | 2/1941 | Tresslar | F16M 11/16 248/177.1 |
| 2,405,321 | A * | 8/1946 | Negovan | E04G 25/04 248/354.1 |
| 2,542,967 | A | 7/1947 | Waechter | |
| 2,453,817 | A * | 11/1948 | Shalkhauser | F16M 11/28 248/183.1 |
| 2,463,655 | A * | 3/1949 | Temple, Jr. | F16M 11/16 248/168 |
| 2,519,549 | A * | 8/1950 | Coutant | F16M 11/16 248/188.5 |
| 2,534,659 | A * | 12/1950 | Cardona | F16M 11/16 248/188.5 |
| 2,702,222 | A * | 2/1955 | Puls | A47B 91/02 248/188.5 |
| 2,924,014 | A * | 2/1960 | Jones | G01C 3/18 33/284 |
| 3,287,040 | A * | 11/1966 | Verticchio | F16B 7/149 248/188.5 |
| 3,741,509 | A * | 6/1973 | Kelly | F16M 11/046 248/161 |
| 4,520,981 | A | 6/1985 | Harrigan | |
| 4,570,886 | A * | 2/1986 | Mooney | F16M 11/34 248/186.1 |
| 4,691,444 | A * | 9/1987 | Capps | G01C 15/00 33/290 |
| 4,767,090 | A * | 8/1988 | Hartman | F16M 11/16 24/273 |
| 4,793,197 | A | 12/1988 | Petrovsky | |
| 4,833,846 | A * | 5/1989 | McFeetors | E04H 12/20 52/154 |
| 4,872,627 | A * | 10/1989 | O'Connor | F16B 7/105 248/168 |
| 4,926,561 | A * | 5/1990 | Miller | G01C 15/06 33/293 |
| 5,253,833 | A * | 10/1993 | Indou | F16M 11/36 248/168 |
| 5,320,316 | A | 6/1994 | Baker | |
| 5,351,922 | A * | 10/1994 | Lindsay | F16M 11/32 192/109 R |
| 5,503,357 | A * | 4/1996 | Johnson | F16M 11/16 248/169 |
| 6,240,857 | B1 * | 6/2001 | Elizer | A47B 97/04 108/147.17 |
| 6,286,795 | B1 * | 9/2001 | Johnson | F16M 11/16 248/163.1 |
| 6,305,653 | B1 * | 10/2001 | Oldham | F16M 11/04 248/125.8 |
| 6,382,223 | B1 * | 5/2002 | Lah | E04H 15/34 135/114 |
| 6,442,906 | B1 * | 9/2002 | Hwang | E04F 15/0247 248/188.4 |
| 6,523,707 | B2 | 2/2003 | Liu | |
| 6,536,723 | B1 | 3/2003 | Nakatani | |
| 6,557,572 | B2 * | 5/2003 | Lah | E04H 15/48 135/114 |
| 6,631,877 | B1 | 10/2003 | Crain et al. | |
| 6,688,566 | B1 * | 2/2004 | Crain | G01C 15/00 248/168 |
| 6,702,482 | B2 * | 3/2004 | Sherwin | F16M 11/34 248/168 |
| 6,705,482 | B2 | 3/2004 | Sherwin | |
| 6,854,697 | B2 * | 2/2005 | Akaike | F16M 11/32 248/161 |
| 6,942,187 | B2 * | 9/2005 | Blackburn | F16M 11/32 248/163.1 |
| 7,513,470 | B2 * | 4/2009 | Lomberk | F16M 11/32 108/106 |
| 7,604,208 | B2 * | 10/2009 | Tacklind | F16M 11/36 248/170 |
| 7,654,494 | B2 * | 2/2010 | Cartoni | F16M 11/36 248/163.1 |
| 7,967,259 | B2 | 6/2011 | Nakatani | |
| 8,231,088 | B2 * | 7/2012 | Lu | F16M 11/34 248/163.1 |
| 8,292,240 | B2 * | 10/2012 | Hein | F16M 11/32 248/125.8 |
| 8,317,141 | B2 | 11/2012 | Fischer | |
| 8,413,936 | B2 * | 4/2013 | Wang | F16M 11/10 248/155 |
| 8,567,731 | B2 * | 10/2013 | Nakaniwa | F16M 11/36 248/163.1 |
| D694,139 | S | 11/2013 | Koeniger et al. | |
| 8,714,426 | B2 * | 5/2014 | Bohurjak | A45F 3/04 224/153 |
| 8,720,896 | B2 * | 5/2014 | Matthis | F41J 1/10 248/163.2 |
| 9,095,207 | B2 * | 8/2015 | Schindler | A47B 5/02 |
| 2002/0011196 | A1 * | 1/2002 | Floyd, II | A47B 23/02 108/157.16 |
| 2003/0033760 | A1 * | 2/2003 | Rogers | E02D 27/34 52/167.7 |
| 2007/0080268 | A1 * | 4/2007 | Worrell | E04F 21/06 248/177.1 |
| 2007/0095246 | A1 * | 5/2007 | Heiligenmann | F16M 11/16 104/307 |
| 2011/0232066 | A1 * | 9/2011 | Olerud | F16M 11/14 29/428 |
| 2012/0067752 | A1 * | 3/2012 | Bohurjak | A45F 3/04 206/320 |
| 2013/0026309 | A1 * | 1/2013 | Ball | G06F 1/166 248/122.1 |
| 2017/0045180 | A1 * | 2/2017 | Schaeffer | F16M 11/24 |

FOREIGN PATENT DOCUMENTS

| | | |
|---|---|---|
| DE | 202006020356 U1 | 6/2008 |
| GB | 182237 A | 7/1922 |

* cited by examiner

LEG FOR AN APPARATUS FOR SUPPORTING AN OBJECT

CROSS-REFERENCE TO RELATED APPLICATION

This application claims priority to Provisional Patent Application Ser. No. 62/476,128, filed on Mar. 24, 2017.

FIELD OF THE INVENTION

The present invention is directed to an improved leg for an apparatus for supporting an object.

BACKGROUND OF THE INVENTION

Tripods are known for simplicity and utility. Three legs provide support and stability for most objects, with the construction of the tripod being dependent, at least in part, on the size of the object being supported. Various improvements have been made to tripods directed to ease of set-up and break-down, which is important for sports and nature photographers, for example, where moving quickly from location to location can yield better photographic opportunities. Thus, certain improvements have been directed to quickly collapsible legs that facilitate rapid set-up and break-down. For such improvements, the legs of the tripods typically comprise nested segments that are tapered wider to narrower from top to bottom so that the legs can be quickly extended and retracted.

Various devices and structures have been developed to secure the nested segments of tripod legs, as disclosed in exemplary U.S. Pat. Nos. 921,335, 880,063, 1,358,402, 1,915,628, 2,542,967, and 5,320,316. As noted above, an objective of these devices and structures is to facilitate extension and retraction of the nested leg segments for rapid deployment of the tripod, quick and easy adjustment of its height, and rapid collapse and retraction. In all of these prior art references, the tripod legs are adjustable to set the vertical height of the object supported by the tripod. These adjustable legs may also be set to accommodate an uneven surface upon which the tripod is set to maintain a desired orientation of the object supported by the tripod.

It is uncommon to find a support comprised of two or more nested sections arranged in moving relation to each other where the sections are intended to impede retraction of the nested sections. One such example is found in U.S. Pat. No. 311,578 of Haskell. This patent discloses a scaffolding having vertical uprights A, and a frame B that is movable up and down on the uprights. The vertical uprights A are generally angled away from each other and are connected at an end by a U-shaped spring that enables the uprights to be moved towards and away from each other and that biases the uprights away from each other. A locking bar F is provided below the frame B so that when the frame B is positioned at a desired height, the locking bar F holds the vertical uprights A apart, with the frame B locking itself in place on the vertical frame A by its own weight. The locking bar F is connected to the frame B so that they move together. Consequently, when the frame B is moved up and down along the vertical upright A to position the height of the frame B, the locking member F moves with it. In addition, upward movement of the frame B and locking bar F causes the vertical uprights A to move apart from each other due to interference with the locking bar F, and downward movement of the frame B causes the vertical uprights A to move towards each other. Thus, the width of the space defined between the vertical uprights A is variable as a function of the position of the frame B and locking bar F. This is necessarily the case for Haskell because its disclosure is directed to a scaffolding having an adjustable height and that is securable at a location once a desired height is set. Thus, Haskell teaches a structure that is positionable by a user at any of a plurality of heights and, once so positioned, secured at that height by interference between and among the various parts of the scaffolding. Thus, the scaffolding of Haskell would not work if the width of the space between the uprights A was fixed because it would be one of wider than, narrower than, or the same as the width of the locking bar F, in which cases the frame B would not be adjustable downward or upward, or securable in place. To perform the essential function of the scaffolding of Haskell—adjustability—the width between the uprights must be adjustable. Finally, as Haskell is directed to a scaffolding, it is essential that the frame B be movable up and down along the vertical uprights A so that the scaffolding can be adjusted to the desired height. It is therefore also essential that the vertical uprights A be movable towards and away from each other as the frame B is moved upward and downward along the uprights. Having vertical uprights A at a fixed distance from each other (i.e., defining a fixed width between them) would render the disclosure of Haskell inoperable for its intended use and purpose of providing a vertically adjustable support for a platform for plasterers, paper hangers, etc.

As noted above, tripods are generally designed to facilitate rapid set-up and breakdown, or to provide locking adjustability. What is lacking in the prior art is a tripod that prevents collapse, which is the problem to which the present invention is directed.

SUMMARY OF THE INVENTION

The present invention is directed to an improved leg for an apparatus for supporting an object. The improved leg of the present invention may be used in any variety of apparatus for supporting an object where it is desirable to prevent the apparatus from collapsing. In a preferred embodiment of the present invention, the inventive leg is provided as at least one leg of a tripod for supporting an object, the tripod having a plurality of legs each having upper and lower leg assemblies that are arranged in moving relation with each other, wherein at least one leg is in accordance with embodiments of the present invention and prevents that leg from collapsing.

An embodiment of the present invention is directed to an apparatus for supporting an object comprising a plurality of legs, wherein at least one of the plurality of legs comprises an upper leg assembly comprising an elongate first upper leg member and an elongate second upper leg member each having a length and each having first and second ends. The first and second end of each of the first upper leg member and the second upper leg member are secured so as to define a space having a fixed width between the first upper leg member and the second upper leg member. The at least one of the plurality of legs further comprises a lower leg assembly comprising a lower leg having a first section defining a fixed first width and a second section defining a fixed second width greater than the first width. The fixed first width is equal to or less than the fixed width of the space, and the fixed second width is greater than the fixed width of the space. The lower leg is located between the first upper leg member and second upper leg member such that movement of the lower leg being impeded by interference between the first upper leg member and the second upper leg member, and the second section of the lower leg.

An embodiment of the present invention is further directed to an apparatus for supporting an object, wherein each of the first upper leg member and second upper leg member are cylindrical, and wherein a channel is defined in each of an opposite side of the lower leg. The channel is complementarily sized and shaped to receive at least a part of each of the first upper leg member and second upper leg member.

An embodiment of the present invention is further directed to an apparatus for supporting an object, further comprising a hub and a mount for each of the plurality of legs, each mount securing the first end of each of the first and second upper members, and wherein the mount of each of the plurality of legs is hingedly connected to the hub at a different location.

An embodiment of the present invention is further directed to an apparatus for supporting an object, further comprising an elevator configured for changing a vertical position of the object.

An embodiment of the present invention is further directed to an apparatus for supporting an object, wherein the elevator further comprises a platform for supporting the object, a rod connected with the platform, and a vertical adjuster comprising a first ring and a second ring each rotatably connected with the rod. The second ring is rotatable to adjust a vertical position of the platform, and the first ring is rotatable to secure a vertical position of the platform.

An embodiment of the present invention is further directed to an apparatus for supporting an object, further comprising a tightener located proximate the second end of each of the first and second upper leg member. The tightener is tightenable to fix a position of the upper leg assembly and lower leg assembly with respect to each other.

An embodiment of the present invention is further directed to an apparatus for supporting an object, wherein the tightener further comprises a bracket proximate an end of each of the first upper leg member and second upper leg member, and a screw threadedly connected with the bracket.

An embodiment of the present invention is further directed to an apparatus for supporting an object, further comprising a brace comprising a plurality of leg supports, each leg support being connected to one of the plurality of legs.

An embodiment of the present invention is further directed to an apparatus for supporting an object, further comprising an accessory tray supported by the brace.

Another embodiment of the present invention is directed to a leg for an apparatus for supporting an object for movement between a first position and a second position. The leg comprises an upper leg assembly comprising an elongate first upper leg member and an elongate second upper leg member each having a length and each having first and second ends. The first and second end of each of the first upper leg member and the second upper leg member are secured so as to define a space having a fixed width between the first upper leg member and the second upper leg member. The inventive leg further comprises a lower leg assembly comprising a lower leg having a first section defining a fixed first width and a second section defining a fixed second width greater than the first width. The fixed first width is equal to or less than the fixed width of the space, and the fixed second width is greater than the fixed width of the space. The lower leg is positioned between the first upper leg member and second upper leg member, movement of the lower leg being impeded by interference between the first upper leg member and the second upper leg member, and the second section of the lower leg.

An embodiment of the present invention is further directed to a leg for an apparatus for supporting an object, wherein each of the first upper leg member and second upper leg member are cylindrical, and wherein a channel is defined in each of an opposite side of the lower leg. The channel is complementarily sized and shaped with the shape of each of the first upper leg member and second upper leg member.

An embodiment of the present invention is further directed to a leg for an apparatus for supporting an object, further comprising a tightener located proximate the second end of each of the first and second upper leg member. The tightener is tightenable to fix a position of the upper leg assembly and lower leg assembly with respect to each other.

An embodiment of the present invention is further directed to a leg for an apparatus for supporting an object, wherein the tightener further comprises a bracket proximate an end of each of the first upper leg member and second upper leg member, and a screw threadedly connected with the bracket.

DESCRIPTION OF THE DIAGRAMS

Embodiments of the present invention will now be described regarding the following figures, wherein.

DESCRIPTION OF EMBODIMENTS OF THE INVENTION

The following describes exemplary embodiments of the present invention. It should be apparent to those skilled in the art that the described embodiments of the present invention are illustrative only and not limiting, having been presented by way of example only. All features disclosed in this description may be replaced by alternative features serving the same or similar purpose, unless expressly stated otherwise. Therefore, numerous and various other embodiments are contemplated by, and fall within the scope and spirit of the present invention. More specifically, the various embodiments disclosed herein are provided as illustrative, non-limiting examples of an application of the improved leg of the present invention. Although in a preferred embodiment, the improved leg of the present invention is provided as at least one leg of a tripod, application of the present invention is not limited to that embodiment, nor to use with a tripod. The improved leg of the present invention is usable and may be used with any apparatus for supporting an object where it is desirable to prevent at least a leg of the apparatus from collapsing to avoid possible damage to the object supported by the apparatus.

An illustrative, non-limiting embodiment of the present invention is directed to a tripod having a plurality of legs each having upper and lower leg assemblies that are arranged in limited moving relation with each other to prevent unintended collapse of the tripod. An object such as, by way of non-limiting example, binoculars, is mounted to and supported by the tripod. Although the tripod may comprise a single leg in accordance with the present invention, the tripod preferably has three such legs each comprising an upper leg assembly and a lower leg assembly that are arranged and positioned to move with respect to each other. Preferably, the lower leg of each lower leg assembly is positioned between first and second upper leg members, and moveable within a space having a fixed width and being defined by and between the first and second upper leg members. The lower leg has a first section having a first fixed width that is less than or equal to the fixed width of the space, and second section having a second fixed width that is greater than the fixed width of the space. Thus, when the lower leg is positioned in the space, its movement with respect to the upper leg assembly is limited and will be prevented by interference between the fixed width of the second section and the first and second upper leg members—due to the fixed width of the space being less than the fixed width of the second section of the lower leg. The present invention thus prevents collapse of a leg of a tripod without the need for additional securement means or methods.

Figure 1:
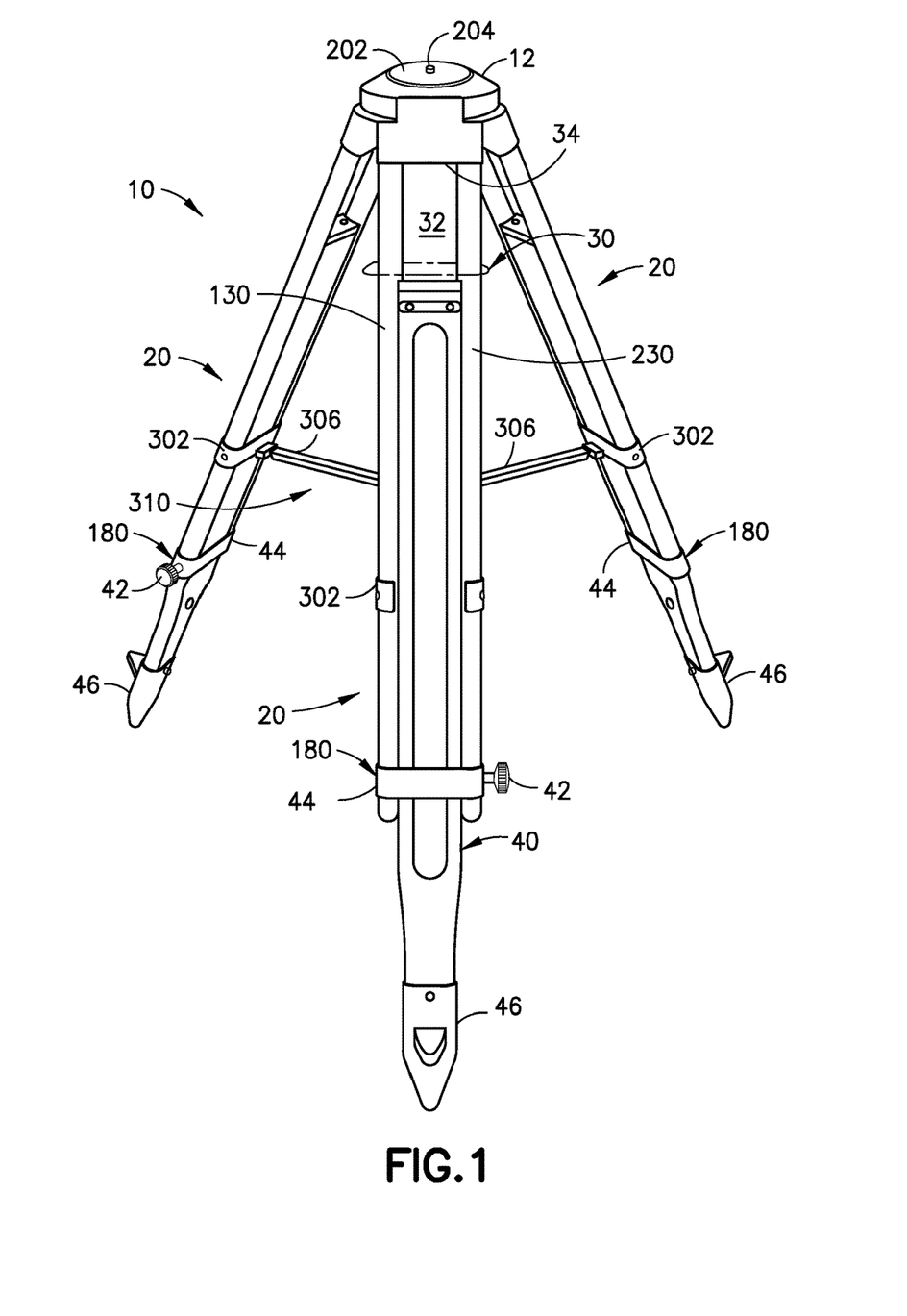
FIG. 1 depicts a tripod in accordance with a first embodiment of the present invention.
Figure 2:
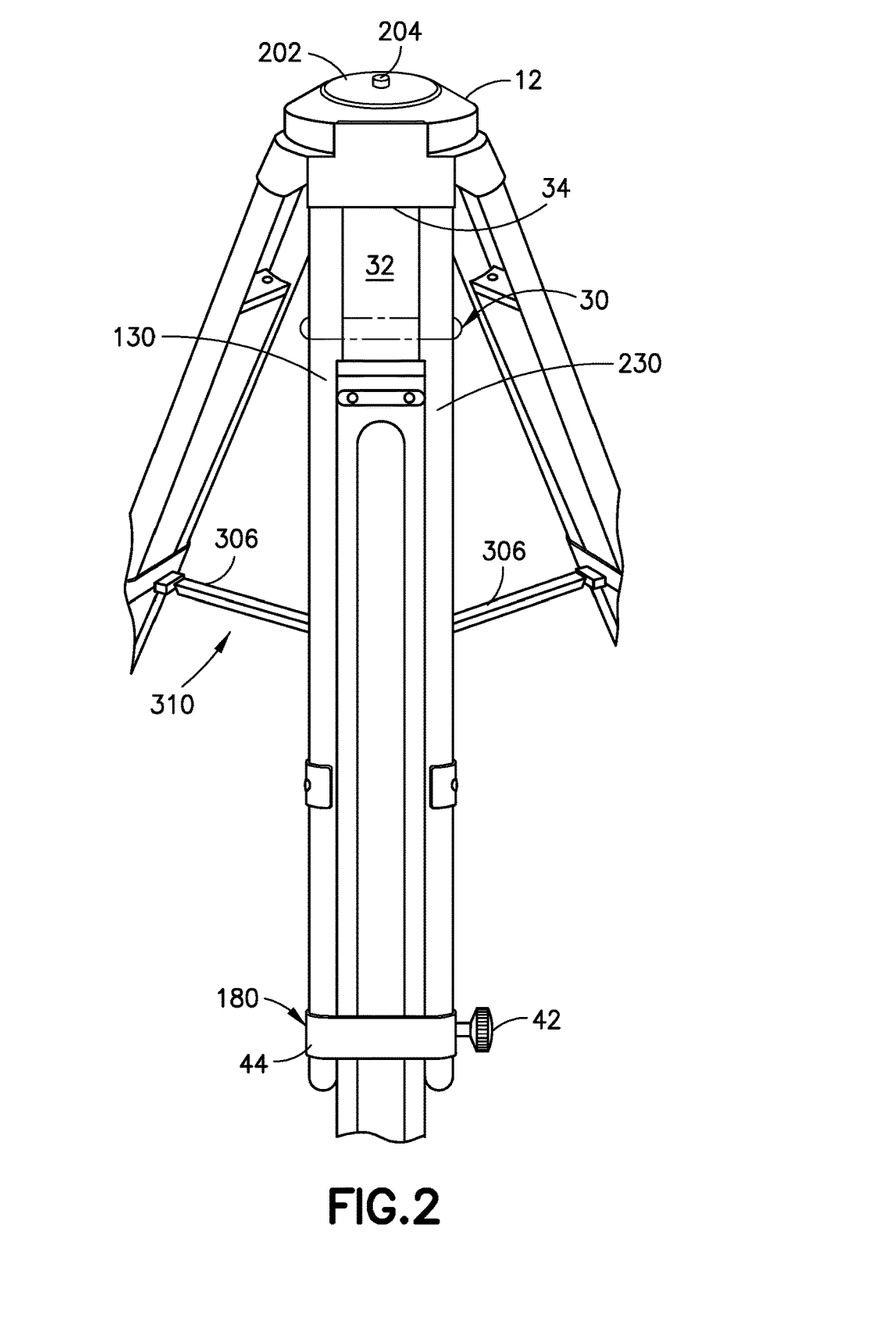
FIG. 2 depicts a detail view of a part of a tripod in accordance with the first embodiment of the present invention.

Referring next to the drawings in detail, a tripod having at least one leg in accordance with embodiments of the present invention is depicted in FIGS. 1 and 2.

Preferably, the tripod 10 has a plurality of legs 20 in accordance with the present invention, each such leg 20 comprising an upper leg assembly 30 and a lower leg assembly 40 arranged in limited moving relation with each other. The upper leg assembly 30 comprises a first upper leg member 130 and a second upper leg member 230 that are each secured at a first end by a mount 34, and that are each secured proximate a second end by a clamp 180 comprised of a bracket 44 and screw 42 threadedly connected with the bracket 44. The clamp 180 is tightenable by the screw 42 that can be used to cause the leg members 130, 230 to be drawn together (i.e., towards each other), compressing the lower leg 140 between the leg members 130, 230 and locking the position of the lower leg 140 with respect to the leg members 130, 230, and thus the length of each leg 20. The mount 34 is preferably hingedly connected to a hub 12, enabling movement of each leg 20 about the hinge between the mount 34 and hub 12. The legs 20 can thus be moved towards and away from each other to position the legs 20 for storage or use. The mount 34 and clamp 180 maintain the first upper leg member 130 and second upper leg member 230 in fixed relation to each other, thereby defining a space 32 having a fixed width. As noted, the clamp 180 can be used as a tightener to draw leg members 130, 230 towards each other, which in turn can control the width of space 32 in the area of the bracket 44. In a preferred embodiment, the first upper leg member 130 and second upper leg member 230 are elongate, cylindrical, and constructed from wood.

Figure 5:
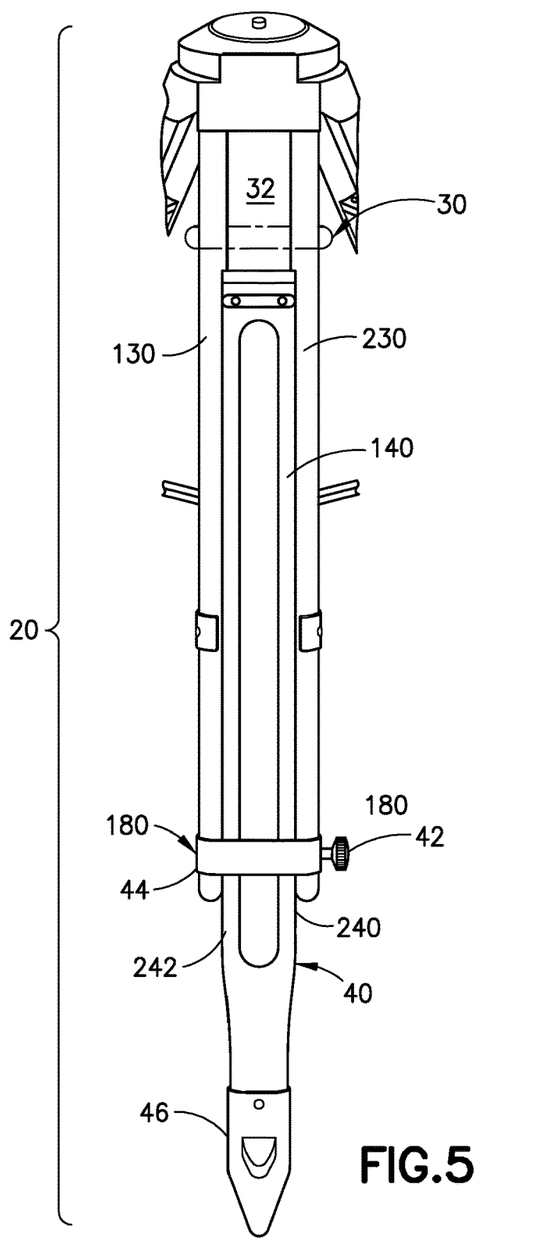
FIG. 5 depicts a detail of a leg of a tripod in accordance with an embodiment of the present invention.
Figure 6:
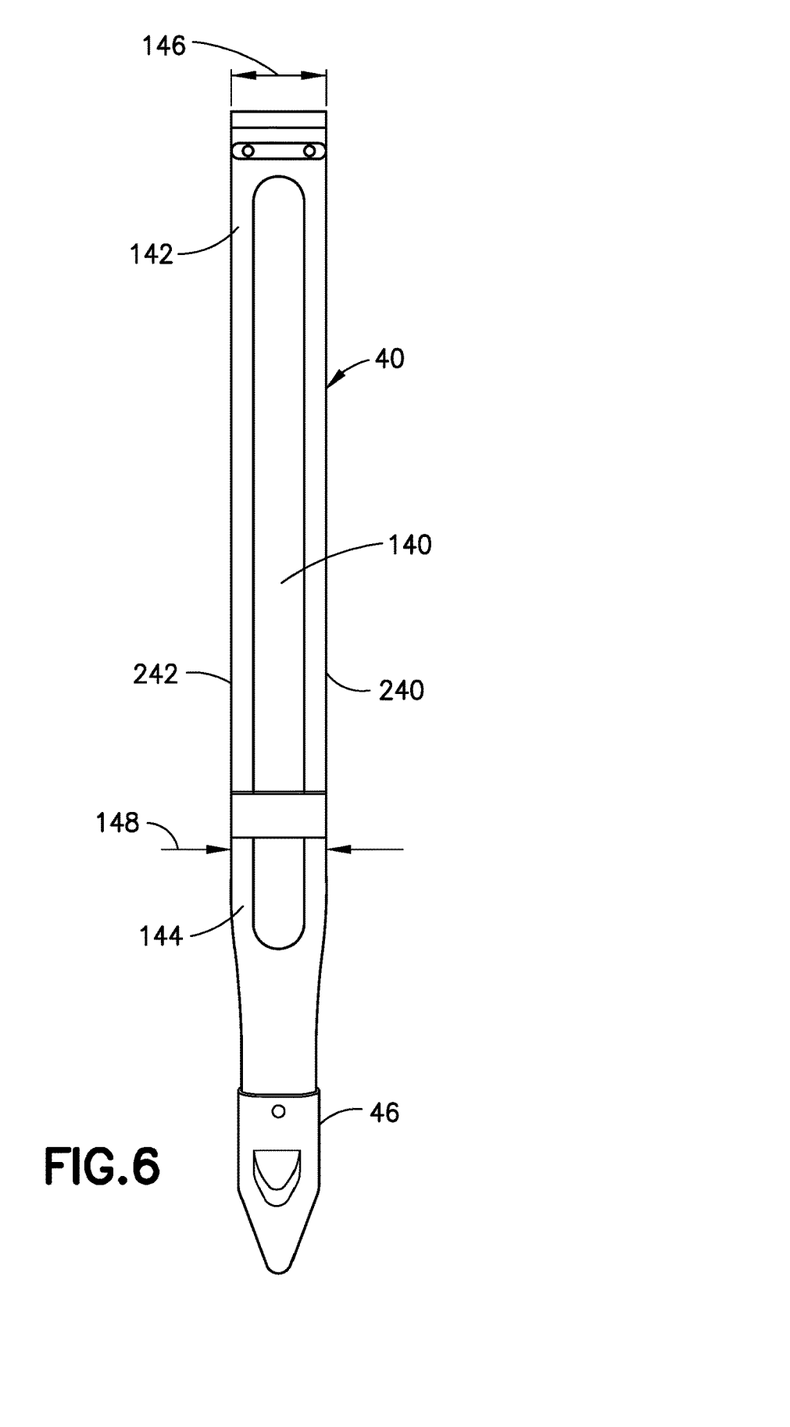
FIG. 6 depicts a lower leg of a tripod in accordance with an embodiment of the present invention.

With additional reference to FIGS. 5 and 6, the lower leg assembly 40 comprises a lower leg 140 having a first section 142 defining a fixed first width 146, and a second section 144 defining a fixed second width 148. In a preferred embodiment, the fixed first width 146 is less than the fixed second width 148, and the difference in dimension of the fixed first width 146 and fixed second width 148 is achieved by a gradual taper lengthwise along lower leg 140 between the first section 142 and the second section 144. Alternatively, the difference in dimension may be achieved via a step, ramp, or other transition between the first section 142 and second section 144. In addition, the fixed first width 146 is equal to or less than the width of the space 32, and the fixed second width 148 is greater than the width of the space 32. A channel 240, 242 is defined on opposite sides of the lower leg 140 and is sized and shaped to receive a part of one of the first upper leg member 130 and second upper leg member 230. Each channel 240, 242 may extend generally at least from the first section 142 to the second section 144, or along most of, or the entire length of the lower leg 140. A cap 46 may be provide on a free end of the lower leg for protection and stability.

The tripod 10 further includes a brace 310 comprised of a plurality of leg supports 306, each having a mount 302, each mount 302 being sized and shaped to engage a first upper leg member 130 and a second upper leg member 230 and to secure them in position with respect to an outer surface of a lower leg 140. While the leg members 130, 230 and lower leg 140 may be in contact with each other, movement between them may still be possible when the clamp 180 is not tightened. Each mount 302 also fixes the distance between leg members 130, 230 to define the space 32. The plurality of leg support 306 converge and hingedly connect together at a center-point (not shown), to enable them to be folded along with the legs 20. The brace 310 provides stability between and among the legs 20 when the tripod 10 is in use and may be collapsible for storage of the tripod 10. An accessory tray 300 (see, e.g., FIG. 3) may also be provided and coupled to the leg supports 306.

Figure 3:
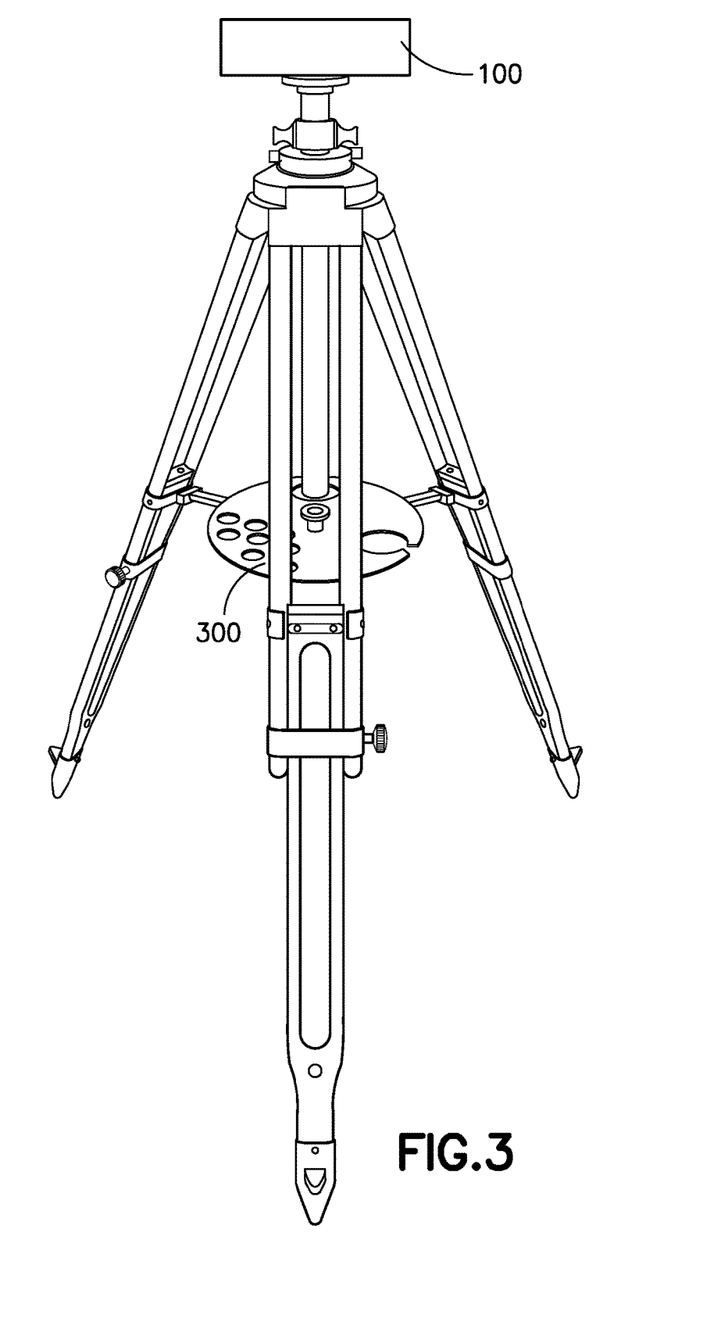
FIG. 3 depicts a tripod in accordance with a second embodiment of the present invention.
Figure 4:
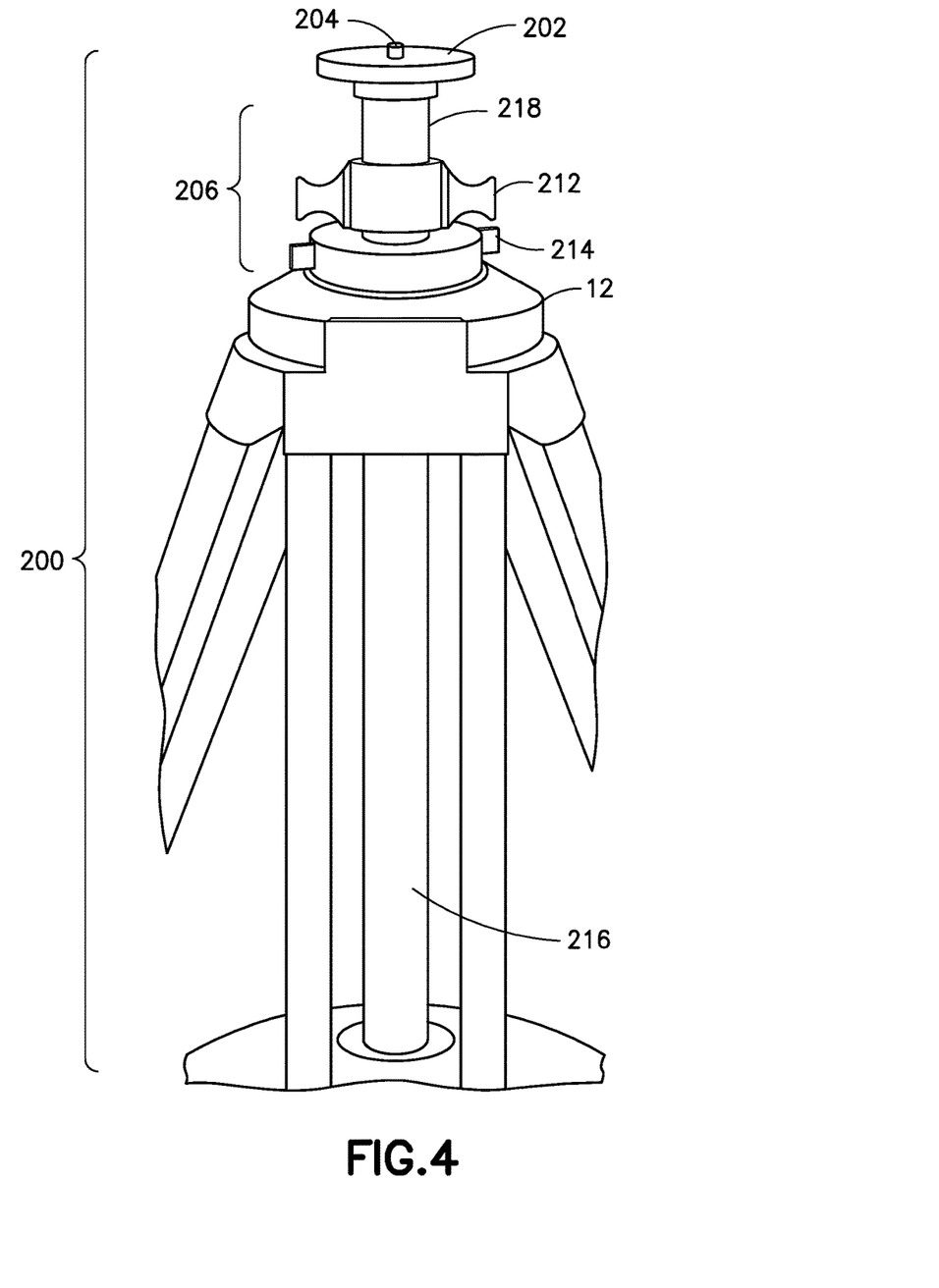
FIG. 4 depicts a detail view of a part of a tripod in accordance with the second embodiment of the present invention.

With reference next to FIGS. 3 and 4, a tripod 10 in accordance with an alternative embodiment of the present invention includes a vertically movable elevator 200 for supporting an object 100. The object 100 may be a camera, telescope, binoculars, surveying equipment, or device of any type—the type of device supported by the inventive tripod not limiting or defining the scope or spirit of the present invention. The elevator 200 comprises a platform 202 for the object 100 that is connected with a rod 216. The platform 202 may be disc-shaped, square, rectangular, or other shapes suitable for supporting objects 100 of a plurality of shapes, sizes and weights. Securement means 204 may be provided with the platform 202 to secure the object 100 in place. The elevator 200 further comprises a vertical adjuster 206 comprising a first ring 212 and a second ring 214 that are selectably rotatable to adjust and secure a vertical position of the platform 202 and object 100. Each of the first ring 212 and second ring 214 have a threaded aperture (not shown) that engage a threaded exterior surface 218 of the rod 216. Vertical adjustment of the platform 202 is made by rotating the second ring 214, thereby causing movement of the rod 216. Such rotation will cause vertical upward and downward movement of the rod 216, as the second ring 214 is rotatable at a fixed location in relation to the hub 12, and thus will not move vertically with movement of the rod 216. In contrast, the first ring 212 moves with vertical movement of the rod 216 and can be used to fix the rod 216 and platform 202 in a desired vertical position by rotating the first ring 212 into close, preferably confronting engagement with the second ring 214 once the platform 202 is in a desired position, thereby serving to lock the platform 202 at the desired vertical position. This close or confronting engagement between the first ring 212 and second ring 214 prevents downward vertical movement of the platform 202, but it does not prevent further upward vertical movement of the platform 202.

In a preferred alternative embodiment, the tripod 10 of the present invention does not include an elevator 200 or other means to adjust the vertical position of the object 100. Notwithstanding the foregoing, the vertical position of an object 100 supported by a tripod 10 in accordance with the present invention may be adjusted by varying the length of one or more legs 20, by varying the angular position of one or more legs 20 with respect to a center-line of the tripod 10, or in other ways.

In use, an object 100 is secured to the platform 202 of the tripod 10 by securement means 204 that may be a screw, clip, clamp, or other means or device to secure the object 100 in place on the platform 202. The vertical height of the object 100 is set by the legs 20 and by the vertical position of the platform 202 (if an elevator 200 is provided). The position of the upper leg assembly 30 and lower leg assembly 40 with respect to each other is fixed by tightening the clamp 180 comprised of the bracket 44 and screw 42. The length of each leg 20 may be set separately, and they need not all be set to the same length. For example, the legs 20 may be set at different lengths to accommodate an uneven surface, or to set the vertical height of the object 100. Unlike many tripods, the tripod 10 of the present invention is intended to remain generally stationary, i.e., it is not set up and taken down regularly or relocated, but rather is typically placed and used in one location. Thus, once the upper leg assembly 30 and lower leg assembly 40 are fixed in place with relation to each other, they are typically not thereafter used to adjust the vertical height of the object 100 during use, and are intended to remain fixed in place by location of upper leg members 130, 230 in channels 240, 242 (on opposite sides of the lower leg 140), and by contacting frictional engagement of the first upper leg member 130, second upper leg member 230, and lower leg 140, as set by the clamp 180. Despite the fact that the position of the upper leg assembly 30 and lower leg assembly 40 are secured with respect to each other, the tripod 10 is preferably made from wood and is thus subject to expansion and/or contraction over time and dependent upon environmental conditions. It is possible that any or all of the first upper leg member 130, second upper leg member 230 and lower leg 140 may expand and/or contract, resulting in change in their respective dimensions and possibly resulting in the upper leg assembly 30 shifting with respect to the lower leg assembly 40. In many cases, the object 100 supported by the tripod 10 is an expensive and heavy optical device such as, for example, binoculars or a telescope. If the various components of the tripod 10 are exposed to environmental conditions that cause a change in the dimensions of any or all of the components, the weight of the object 100 can cause one or more legs 20 of the tripod 10 to collapse. The fixed width of the space 32, and the tapered construct of the lower leg 140 limit the effect of such a situation. Specifically, because the fixed second width 148 of the second section 144 is greater than the width of the space 32, movement of the upper leg assembly 30 with respect to the lower leg assembly 40 is impeded when the first upper leg member 130 and second upper leg member 230 encounter the wider second section 144 of the lower leg 140. Consequently, shifting of the relative position of the upper and lower leg assemblies 30, 40 is limited by the present invention, and collapse of the tripod 10 is prevented. The location of the fixed second width 148 on the lower leg 140 is a matter of design choice, and depends, in part, upon the desired limitation of movement between the upper and lower leg assemblies 30, 40. By way of illustration, and not limitation, the fixed second width 148 may be provided over a majority of the length of lower leg 140, halfway along the length of lower leg, or in other ways, as a routine matter of design choice.

Modifications to embodiments of the present invention are possible without departing from the scope of the invention as defined by the accompanying claims. Expressions such as "including," "comprising," "incorporating," "consisting of," "have," "is," used to describe and claim the present invention are intended to be construed in a non-exclusive manner, namely allowing for articles, components or elements not explicitly described herein also to be present. Reference to the singular is to be construed to relate to the plural, where applicable.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. An apparatus for supporting an object comprising: a plurality of legs, wherein at least one of the plurality of legs comprises:
    an upper leg assembly comprising an elongate first upper leg member and an elongate second upper leg member each having a length and each having first and second ends, the first and second end of each of the first upper leg member and the second upper leg member being secured so as to define a space having a width between the first upper leg member and the second upper leg member; and
    a lower leg assembly comprising a lower leg having an upper first section near a first end of the lower leg and a lower second section near a second free end of the lower leg, the upper first section and lower second section being separated from each other along a majority of the length of the lower leg, the upper first section defining an outer first width, and the lower second section defining an outer second width greater than the outer first width such that the lower leg has a tapered outer width defined between the upper first section and the lower second section and extending along the majority of the length of the lower leg, the outer first width being equal to or less than the width of the space, and the outer second width being greater than the width of the space, the lower leg being located between the first upper leg member and second upper leg member, movement of the lower leg being impeded by interference between the first upper leg member and the second upper leg member, and the lower second section of the lower leg.

2. The apparatus according to claim 1, wherein each of the first upper leg member and second upper leg member are cylindrical, and wherein a channel is defined in each of an opposite side of the lower leg, each channel being complementarily sized and shaped to receive at least a part of each of the first upper leg member and second upper leg member.

3. The apparatus according to claim 1, further comprising a hub and a mount for each of the plurality of legs, each mount securing the first end of each of the first and second upper leg members, and wherein the mount of each of the plurality of legs is hingedly connected to the hub at a different location.

4. The apparatus according to claim 1, further comprising:
a hub;
a mount connected to a first end of each of the first upper leg member and the second upper leg member, the mount being hingedly connected to the hub; and
an elevator connected to the hub and configured for changing a vertical position of the object.

5. The apparatus according to claim 4, wherein the elevator further comprises:
a platform for supporting the object;
a rod connected with the platform and the hub; and
a vertical adjuster comprising a first ring and a second ring each rotatably connected with the rod, the second ring being rotatable to adjust a vertical position of the platform, and the first ring being rotatable to secure a vertical position of the platform.

6. The apparatus according to claim 1, further comprising a tightener located proximate the second end of each of the first and second upper leg member, the tightener being tightenable to fix a position of the upper leg assembly and lower leg assembly with respect to each other.

7. The apparatus according to claim 6, wherein the tightener further comprises a bracket proximate an end of each of the first upper leg member and second upper leg member, and a screw threadedly connected with the bracket.

8. The apparatus according to claim 1, further comprising a brace comprising a plurality of leg supports, each leg support being connected to one of the plurality of legs.

9. The apparatus according to claim 8, further comprising an accessory tray supported by the brace.

10. A leg for an apparatus for supporting an object, the leg comprising:
an upper leg assembly comprising an elongate first upper leg member and an elongate second upper leg member each having a length and each having first and second ends, the first and second end of each of the first upper leg member and the second upper leg member being secured so as to define a space having a width between the first upper leg member and the second upper leg member; and
a lower leg assembly comprising a lower leg having an upper first section near a first end of the lower leg and a lower second section near a second free end of the lower leg, the upper first section and lower second section being separated from each other along a majority of the length of the lower leg, the upper first section defining an outer first width, and the lower second section defining an outer second width greater than the outer first width such that the lower leg has a tapered outer width defined between the upper first section and the lower second section and extending along the majority of the length of the lower leg, the outer first width being equal to or less than the width of the space, and the outer second width being greater than the width of the space, the lower leg being located between the first upper leg member and second upper leg member, movement of the lower leg being impeded by interference between the first upper leg member and the second upper leg member, and the lower second section of the lower leg.

11. The leg according to claim 10, wherein each of the first upper leg member and second upper leg member are cylindrical, and wherein a channel is defined in each of an opposite side of the lower leg, the channel being complementarily sized and shaped with the shape of each of the first upper leg member and second upper leg member.

12. The leg according to claim 10, further comprising a tightener located proximate the second end of each of the first and second upper leg member, the tightener being tightenable to fix a position of the upper leg assembly and lower leg assembly with respect to each other.

13. The leg according to claim 12, wherein the tightener further comprises a bracket proximate an end of each of the first upper leg member and second upper leg member, and a screw threadedly connected with the bracket.

* * * * *